US012659964B2

(12) United States Patent　　　　　(10) Patent No.: US 12,659,964 B2
Wang et al.　　　　　　　　　　　　　(45) Date of Patent: Jun. 16, 2026

(54) SOUNDING REFERENCE SIGNAL (SRS) TRANSMISSIONS TRIGGERED VIA DOWNLINK CONTROL INFORMATION (DCI) FORMATS WITHOUT SCHEDULING INFORMATION

(71) Applicant: Intel Corporation, Santa Clara, CA (US)

(72) Inventors: Guotong Wang, Beijing (CN); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 18/279,262

(22) PCT Filed: Mar. 16, 2022

(86) PCT No.: PCT/US2022/020509
§ 371 (c)(1),
(2) Date: Aug. 29, 2023

(87) PCT Pub. No.: WO2022/203915
PCT Pub. Date: Sep. 29, 2022

(65) Prior Publication Data
US 2024/0172243 A1　May 23, 2024

(30) Foreign Application Priority Data

Mar. 26, 2021　(WO) ................ PCT/CN2021/083200
Apr. 6, 2021　(WO) ................ PCT/CN2021/085591

(51) Int. Cl.
*H04W 72/231*　(2023.01)
*H04B 7/06*　(2006.01)
(Continued)

(52) U.S. Cl.
CPC ........ *H04W 72/231* (2023.01); *H04B 7/0626* (2013.01); *H04L 5/0051* (2013.01); *H04W 72/0446* (2013.01); *H04W 72/1268* (2013.01)

(58) Field of Classification Search
CPC ........... H04W 72/231; H04W 72/0446; H04W 72/1268; H04B 7/0626; H04L 5/0051
(Continued)

(56) References Cited

U.S. PATENT DOCUMENTS 12,323,348 B2 * 6/2025 Oh ........................ H04L 5/0094
2020/0036556 A1 1/2020 Wei et al.
(Continued)

FOREIGN PATENT DOCUMENTS

JP　　2012147134　　8/2012
WO　　2020155362　　8/2020
WO　　WO-2022203915 A1　9/2022

OTHER PUBLICATIONS

"International Application Serial No. PCT/US2022/020509, International Search Report mailed Jun. 23, 2022", 4 pgs.
(Continued)

*Primary Examiner* — Peter G Solinsky
(74) *Attorney, Agent, or Firm* — Schwegman Lundberg & Woessner, P.A.

(57) ABSTRACT

Bandwidth part (BWP) switching for aperiodic sounding reference signal (SRS) transmissions is triggered via a downlink control information (DCI) format that does not include scheduling information. When a DCI format does not schedule a physical uplink shared channel (PUSCH) and does not include a channel state information (CSI) request, the UE may interpret one or more fields of the DCI format for the aperiodic SRS transmission.

20 Claims, 10 Drawing Sheets

SOME SRS PARAMETERS RECONFIGURED BY DCI

THE PREVIOUSLY UPDATED CONFIGURATION DOESN'T APPLY

TIME

DCI 0_1/0_2 WITHOUT PUSCH TRIGGERS SRS SET #A

SRS SET #A TRANSMISSION ACCORDING TO UPDATED CONFIGURATION BY DCI

DCI 0_1 SCHEDULING PUSCH TRIGGERS SRS SET #A

SRS SET #A TRANSMISSION FOLLOWING ORIGINAL RRC CONFIGURATION

(51) Int. Cl.

| | |
|---|---|
| *H04L 5/00* | (2006.01) |
| *H04W 72/0446* | (2023.01) |
| *H04W 72/1268* | (2023.01) |

(58) Field of Classification Search
USPC ......................................................... 370/329
See application file for complete search history.

(56) References Cited

U.S. PATENT DOCUMENTS

| | | | |
|---|---|---|---|
| 2020/0374156 A1* | 11/2020 | Chen ..................... | H04W 72/23 |
| 2021/0076445 A1* | 3/2021 | Tsai .................. | H04W 74/0833 |
| 2023/0239843 A1* | 7/2023 | Liu ....................... | H04L 5/0096 |
| | | | 370/329 |

OTHER PUBLICATIONS

"International Application Serial No. PCT/US2022/020509, Written Opinion mailed Jun. 23, 2022", 4 pgs.

Futurewei, "Enhancements on SRS flexibility, coverage and capacity", R1-2100042, 3GPP TSG RAN WG1 Meeting #104-e, e-Meeting, (Jan. 18, 2021), 25 pgs.

Moderator (ZTE), "Fl summary #3 on SRS enhancements", R1-2101917, 3GPP TSG RAN WG1 Meeting #104-e, e-Meeting,, (Feb. 3, 2021), 25 pgs.

Qualcomm Incorporated, "Discussion on SRS enhancemen", R1-2101451, 3GPP TSG-RAN WG 1 Meeting #104-e, e-Meeting, (Jan. 19, 2021), 41 pgs.

"Japanese Application Serial No. 2023-558762, Notification of Reasons for Rejection mailed Jan. 27, 2026", W English Translation, 8 pgs.

"International Application Serial No. PCT/US2022/020509, International Preliminary Report on Patentability mailed Oct. 5, 2023", 7.

* cited by examiner

```
SRS-ResourceSet ::=          SEQUENCE {
    srs-ResourceSetId            SRS-ResourceSetId,
    srs-ResourceId List          SEQUENCE (SIZE(1..maxNrofSRS-ResourcesPerSet)) OF SRS-ResourceId    OPTIONAL,  -- Cond Setup
    resourceType                 CHOICE {
        aperiodic                    SEQUENCE {
            aperiodicSRS-ResourceTrigger     INTEGER (1..maxNrofSRS-TriggerStates-1),
            csi-RS                           NZP-CSI-RS-ResourceId              OPTIONAL,  -- Cond NonCodebook
            slotOffset                       INTEGER (1..32)                   OPTIONAL,  -- Need S
            ...,
            [[
            aperiodicSRS-ResourceTriggerList-v1530     SEQUENCE (SIZE(1..maxNrofSRS-TriggerStates-2))
                                                           OF INTEGER (1..maxNrofSRS-TriggerStates-1)    OPTIONAL,  -- Need M
            ]]
        },
        semi-persistent              SEQUENCE {
            associatedCSI-RS             NZP-CSI-RS- ResourceId                 OPTIONAL,  -- Cond NonCodebook
            ...
        },
        periodic                     SEQUENCE {
            associatedCSI-RS             NZP-CSI-RS-ResourceId                  OPTIONAL,  -- Cond NonCodebook
            ...
        }
    },
    usage                        ENUMERATED {beamManagement, codebook, nonCodebook, antennaSwitching},
    alpha                        Alpha                                          OPTIONAL,  -- Need S
    p0                           INTEGER (-202..24)                             OPTIONAL,  -- Cond Setup
    pathlossReferenceRS          CHOICE {
        ssb-Index                    SSB-Index,
        csi-RS-Index                 NZP-CSI-RS-ResourceId
    }                                                                           OPTIONAL,  -- Need M
    srs-PowerControlAdjustmentStates    ENUMERATED { sameAsFci2, separateClosedLoop}    OPTIONAL,  -- Need S
    ...
}
```

*Fig. 1D*

```
SRS-Resource ::=          SEQUENCE {
    srs-ResourceId            SRS-ResourceId,
    nrofSRS-Ports             ENUMERATED {port1, ports2, ports4},
    ptrs-PortIndex            ENUMERATED {n0, n1 }          OPTIONAL,    -- NEED R
    transmissionComb          CHOICE {
        n2                        SEQUENCE {
            combOffset-n2             INTEGER (0..1),
            cyclicShift-n2            INTEGER (0..7)
        },
        n4                        SEQUENCE {
            combOffset-n4             INTEGER (0..3),
            cyclicShift-n4            INTEGER (0..11),
        }
    },
    resourceMapping           SEQUENCE {
        startPosition             INTEGER (0..5),
        nrofSymbols               ENUMERATED {n1, n2, N4},
        repetitionFactor          ENUMERATED {n1, n2, N4}
    },
    freqDomainPosition        INTEGER (0..67),
    freqDomainShift           INTEGER (0..268),
    freqHopping               SEQUENCE {
        c-SRS                     INTEGER (0..63),
        b-SRS                     INTEGER (0..3),
        b-hop                     INTEGER (0..3)
    },
    groupOrSequenceHopping    ENUMERATED { neither, groupHopping, sequenceHopping },
    resourceType              CHOICE {
        aperiodic                 SEQUENCE {
            ...
        },
        semi-persistent           SEQUENCE {
            periodicityAndOffset-sp   SRS-PeriodicityAndOffset,
            ...
        },
                                  SEQUENCE {
            SRS-PeriodicityAndOffset,
    sequenceId                INTEGER (0..1023),
    spatialRelationInfo       SRS-SpatialRelationInfo       OPTIONAL,    -- NEED R
    ...
```

Fig. 1E

SOUNDING REFERENCE SIGNAL (SRS) TRANSMISSIONS TRIGGERED VIA DOWNLINK CONTROL INFORMATION (DCI) FORMATS WITHOUT SCHEDULING INFORMATION

PRIORITY CLAIM

This application is a U.S. National Stage Filing under 35 U.S.C. 371 from International Application No. PCT/US2022/020509, filed Mar. 16, 2022 and published in English as WO 2022/203915 on Sep. 29, 2022, which claims priority to International Application No. PCT/CN2021/083200, filed Mar. 26, 2021, and to International Application No. PCT/CN2021/085591, filed Apr. 6, 2021, which applications and publication are incorporated herein by reference and made a part hereof.

TECHNICAL FIELD

Embodiments pertain to wireless communications. Some embodiments relate to fifth-generation (5G) new radio (NR) (5G-NR) systems. Some embodiments relate to aperiodic sounding reference signal (SRS) transmissions by a user equipment (UE). Some embodiments relate to sixth-generation (6G) networks.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

One issue with scheduling sounding reference signal (SRS) transmissions in 5G NR systems is that SRS transmissions are scheduled by downlink control information (DCI) formats that schedule downlink or uplink data transmissions. This restricts how SRS transmissions can be scheduled and limits the parameters for such SRS transmissions. Thus, what is needed is more flexibility for scheduling SRS transmissions in a 5G NR system.

BRIEF DESCRIPTION OF THE DRAWINGS

FIG. 1D illustrates an RRC message for an SRS resource set, in accordance with some embodiments.

FIG. 1E illustrates an RRC configuration for an SRS resource, in accordance with some embodiments.

DETAILED DESCRIPTION

Figure 1A:
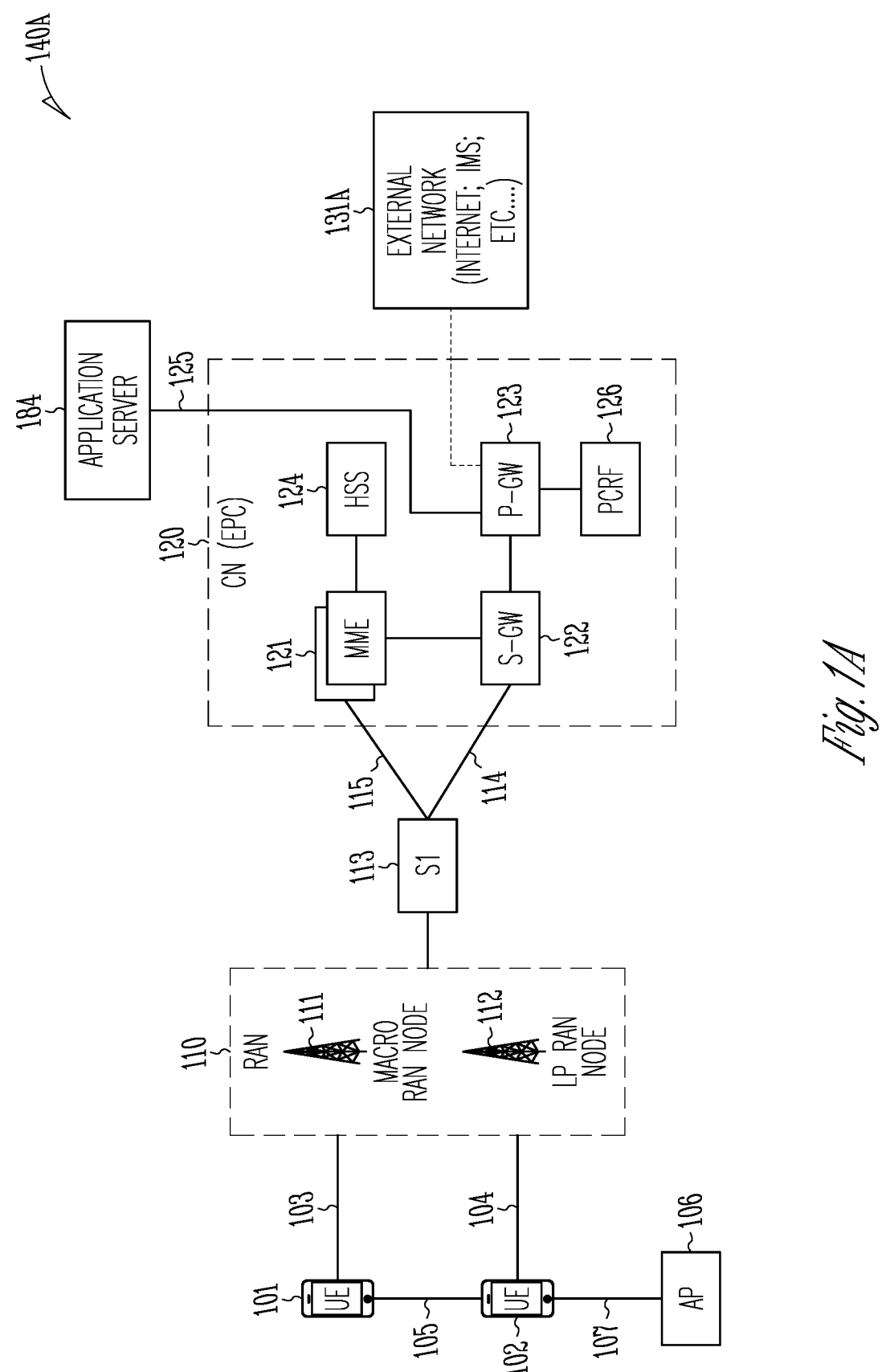
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments disclosed herein are directed to the reuse of DCI fields for SRS transmission. Some embodiments are directed to bandwidth part (BWP) switching for aperiodic sounding reference signal (SRS) transmissions triggered via a DCI format that does not include scheduling information. These embodiments are described in more detail below.

In some embodiments, a user equipment (UE) configured for operation in a fifth-generation (5G) new radio (NR) (5G-NR) system may decode radio-resource control (RRC) signalling. The RRC signalling may configure the UE with a plurality of frequency-domain resource allocations for aperiodic sounding reference signal (SRS) transmission. In these embodiments, the UE may also decode a downlink control information (DCI) format. The DCI format nay comprise one of DCI format 0_1 and DCI format 0_2, although the scope of the embodiments is not limited in this respect.

When the DCI format does not schedule a physical uplink shared channel (PUSCH) and does not include a channel state information (CSI) request, the UE may interpret one or more fields of the DCI format for the aperiodic SRS transmission triggered by the DCI format. In these embodiments, the one of more fields may be interpreted to indicate one of the frequency domain resource allocations of the plurality. In these embodiments, the one or more fields may further be interpreted to indicate a bandwidth part (BWP) identifier (ID) (BWP ID) indicating a BWP for the aperiodic SRS transmission. In these embodiments, the UE may transmit an SRS in the indicated BWP in accordance with the indicated frequency domain resource allocation. In these embodiments, when the BWP ID indicates a BWP that is not an active BWP for the UE, the UE may switch to the indicated BWP for the aperiodic SRS transmission and to switch back to the active BWP after the aperiodic SRS transmission, although the scope of the embodiments is not limited in this respect.

In these embodiments, when the DCI format does not schedule a PUSCH and does not include a CSI request, the processing circuitry is configured to interpret fields, which would normally be used for PUSCH scheduling, for an aperiodic SRS transmission. In these embodiments, when the DCI format does not schedule a PUSCH and does not include a CSI request, the DCI format may be used to dynamically indicate a frequency domain resource allocation and trigger an aperiodic SRS transmission, although the scope of the embodiments is not limited in this respect.

Examples of these embodiments as well as others are illustrated in FIGS. 3-6 and described in more detail below.

In some embodiments, when the DCI format does not schedule a PUSCH and does not include a CSI request, the UE is configured to further interpret the one or more fields of the DCI format as further including an indicator of DL/UL BWP, the indicator of DL/UL BWP indicating whether a downlink (DL) BWP configuration or an uplink (UL) BWP configuration is to be used by the UE for the aperiodic SRS transmission, although the scope of the embodiments is not limited in this respect.

In some embodiments, when the DL BWP configuration is indicated, the UE is configured to transmit the aperiodic SRS transmission following a DL BWP in accordance with the DL BWP configuration. In these embodiments, when the UL BWP configuration is indicated, the UE may be configured to transmit the aperiodic SRS transmission following an UL BWP in accordance with the UL BWP configuration, although the scope of the embodiments is not limited in this respect.

In these embodiments, since the DL BWP and UL BWP configuration may be different (i.e., in a TDD system the DL BWP bandwidth may be 10M and the uplink BWP may be 5M), it may be desirable to use a different SRS configuration depending on the usage of the SRS. For example, since the SRS is an uplink signal, for many usages, the SRS transmission follows the uplink BWP configuration (i.e., the uplink BWP frequency configuration is used for SRS transmission). However for antenna switching, the SRS may be used to calculate a DL precoder based on channel reciprocity of TDD and therefore the SRS transmission may be aligned with DL BWP (i.e., the DL BWP frequency configuration is used for SRS transmission), although the scope of the embodiments is not limited in this respect.

In some embodiments, when the DCI format schedules the PUSCH, the one or more fields of the DCI format may be interpreted by the UE as scheduling information for the PUSCH, although the scope of the embodiments is not limited in this respect.

In some embodiments, when the DCI format does not schedule a PUSCH and does not include a CSI request, and when the BWP ID indicates a BWP that is the active BWP for the UE, the UE may be configured to refrain from switching BWPs for the aperiodic SRS transmission, although the scope of the embodiments is not limited in this respect.

In some embodiments, when the DCI format does not schedule a PUSCH and does not include a CSI request, and when the BWP ID indicates a BWP that is not the active BWP for the UE (i.e., indicating a BWP change for the SRS transmission), the UE may refrain from switching to the indicated BWP for the SRS transmission when a time offset between receipt of the DCI format and a first SRS transmission is less than a delay requirement by the UE for an uplink BWP change. In these embodiments, the BWP ID is interpreted as an invalid BWP switching command, although the scope of the embodiments is not limited in this respect.

In some embodiments, when the DCI format does not schedule a PUSCH and does not include a CSI request, the UE may be configured to interrupt a time-domain resource allocation (TDRA) field of the DCI format as indicating a time-domain resource allocation for the aperiodic SRS transmission, although the scope of the embodiments is not limited in this respect.

In some embodiments, when the DCI format does not schedule a PUSCH and does not include a CSI request, a medium-access control (MAC) layer of the UE may be configured to initiate a BWP inactivity timer (BWP-InactivityTimer) for BWP switching, although the scope of the embodiments is not limited in this respect.

In some embodiments, when the DCI format includes a carrier indicator, and when the DCI format does not schedule a PUSCH and does not include a CSI request, the UE may be configured to discard the carrier indicator, although the scope of the embodiments is not limited in this respect.

In some embodiments, when the DCI format includes a carrier indicator, and when the DCI format does not schedule a PUSCH and does not include a CSI request, the UE may be configured to interpret the carrier indicator as triggering a cross-carrier SRS transmission in which the SRS is to be transmitted over a different carrier than a carrier carrying the DCI format, although the scope of the embodiments is not limited in this respect.

In some embodiments, when the DCI format includes a carrier indicator, and when the DCI format does not schedule a PUSCH and does not include a CSI request, the UE may be configured to interpret the carrier indicator as bitmap triggering the aperiodic SRS transmission over multiple carriers, although the scope of the embodiments is not limited in this respect.

Some embodiments are directed to a non-transitory computer-readable storage medium that stores instructions for execution by processing circuitry of a user equipment (UE) configured for operation in a fifth-generation (5G) new radio (NR) (5G-NR) system. In these embodiments, the instructions may configure the processing circuitry to decode radio-resource control (RRC) signalling. The RRC signalling may configure the UE with a plurality of frequency-domain resource allocations for aperiodic sounding reference signal (SRS) transmission. The instructions may configure the processing circuitry to decode a downlink control information (DCI) format that comprising one of DCI format 0_1 and DCI format 0_2. In these embodiments, when the DCI format does not schedule a physical uplink shared channel (PUSCH) and does not include a channel state information (CSI) request, the processing circuitry may interpret one or more fields of the DCI format for the aperiodic SRS transmission triggered by the DCI format. The one of more fields may be interpreted to indicate one of the frequency domain resource allocations of the plurality. The one or more fields may further be interpreted to indicate a bandwidth part (BWP) identifier (ID) (BWP ID) indicating a BWP for the aperiodic SRS transmission, although the scope of the embodiments is not limited in this respect.

The processing circuitry may also configure the UE to transmit an SRS in the indicated BWP in accordance with the indicated frequency domain resource allocation. When the BWP ID indicates a BWP that is not an active BWP for the UE, the processing circuitry may configure the UE to switch to the indicated BWP for the aperiodic SRS transmission and to switch back to the active BWP after the aperiodic SRS transmission, although the scope of the embodiments is not limited in this respect.

Some embodiments are directed to a gNodeB (gNB) configured for operation in a fifth-generation (5G) new radio (NR) (5G-NR) system. In these embodiments, the gNB may encode radio-resource control (RRC) signalling to configure a user equipment (UE) with a plurality of frequency-domain resource allocations for aperiodic sounding reference signal (SRS) transmission. The gNB may also encode a downlink control information (DCI) format comprising one of DCI format 0_1 and DCI format 0_2 for transmission to the UE. When the DCI format does not schedule a physical uplink shared channel (PUSCH) and does not include a channel state information (CSI) request, the gNB may encode one or more fields of the DCI format for interpretation by the UE for an aperiodic SRS transmission triggered by the DCI format. The one of more fields may be encoded to indicate one of the frequency domain resource allocations of the plurality. The one or more fields may further be encoded to indicate a bandwidth part (BWP) identifier (ID) (BWP ID) indicating a BWP for the aperiodic SRS transmission. In these embodiments, the gNB may receive an SRS from the UE in the indicated BWP in accordance with the indicated frequency domain resource allocation. When the BWP ID indicates a BWP that is not an active BWP for the UE, one of more fields may be encoded to be interpreted by the UE to switch to the indicated BWP for the aperiodic SRS transmission and to switch back to the active BWP after the aperiodic SRS transmission, although the scope of the embodiments is not limited in this respect.

In some embodiments, when the DCI format is encoded not schedule a PUSCH and does not include a CSI request, the one or more fields are encoded to cause the UE to interpret the one or more fields of the DCI format as further including an indicator of DL/UL BWP. In these embodiments, the indicator of DL/UL BWP indicates whether a downlink (DL) BWP configuration or an uplink (UL) BWP configuration is to be used by the UE for the aperiodic SRS transmission. In these embodiments, when the DL BWP configuration is indicated, the processing circuitry of the gNB is configured to decode the aperiodic SRS transmission from the UE following a DL BWP in accordance with the DL BWP configuration. When the UL BWP configuration is indicated, the processing circuitry of the gNB is configured to decode the aperiodic SRS transmission from the UE following an UL BWP in accordance with the UL BWP configuration, although the scope of the embodiments is not limited in this respect.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMES 121, the S-GW 122, the Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMES 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
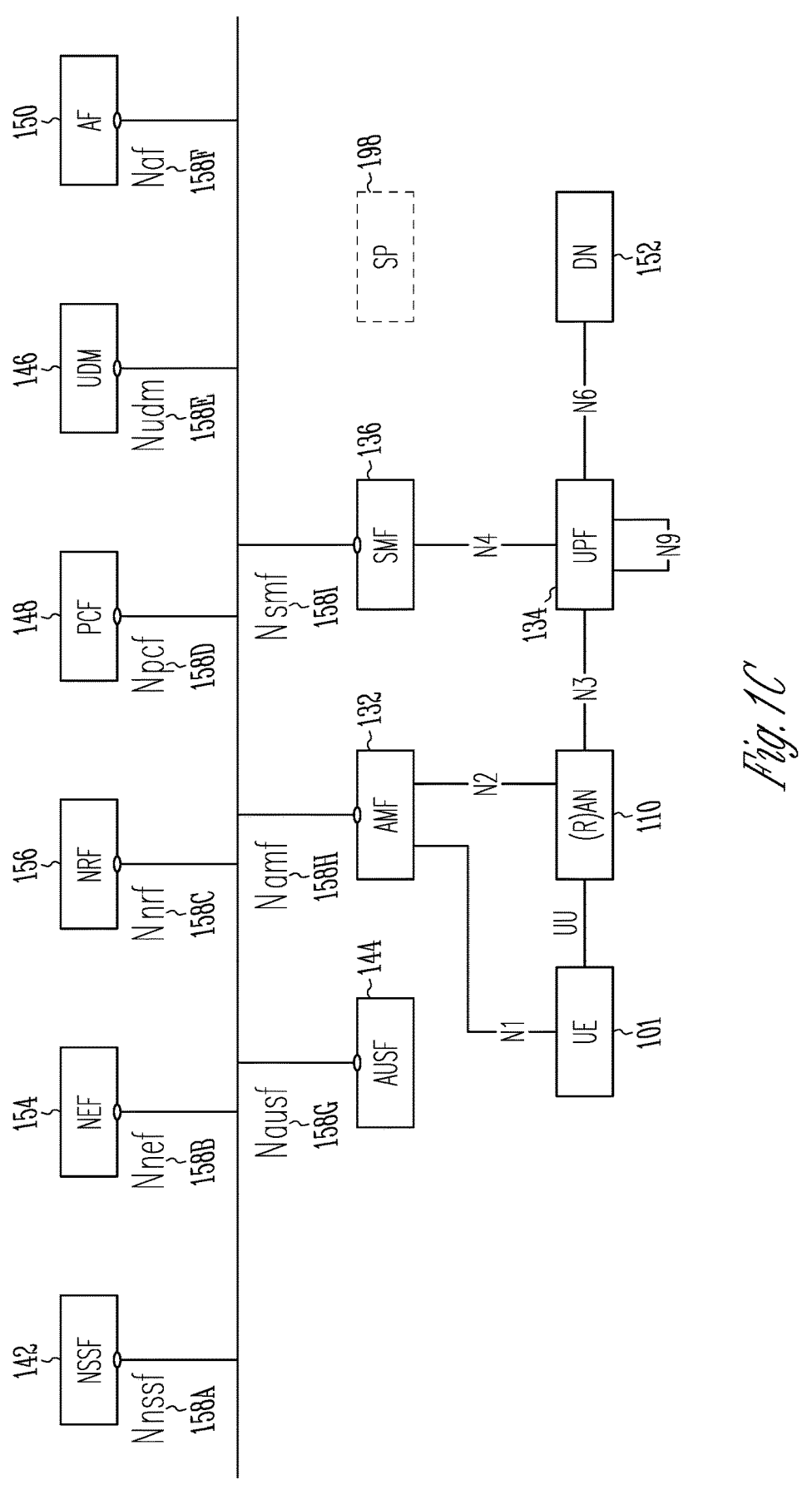

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

FIG. 1D illustrates an RRC message for an SRS resource set, in accordance with some embodiments. FIG. 1E illustrates an RRC configuration for an SRS resource, in accordance with some embodiments. These embodiments are described in more detail below.

Figure 2:
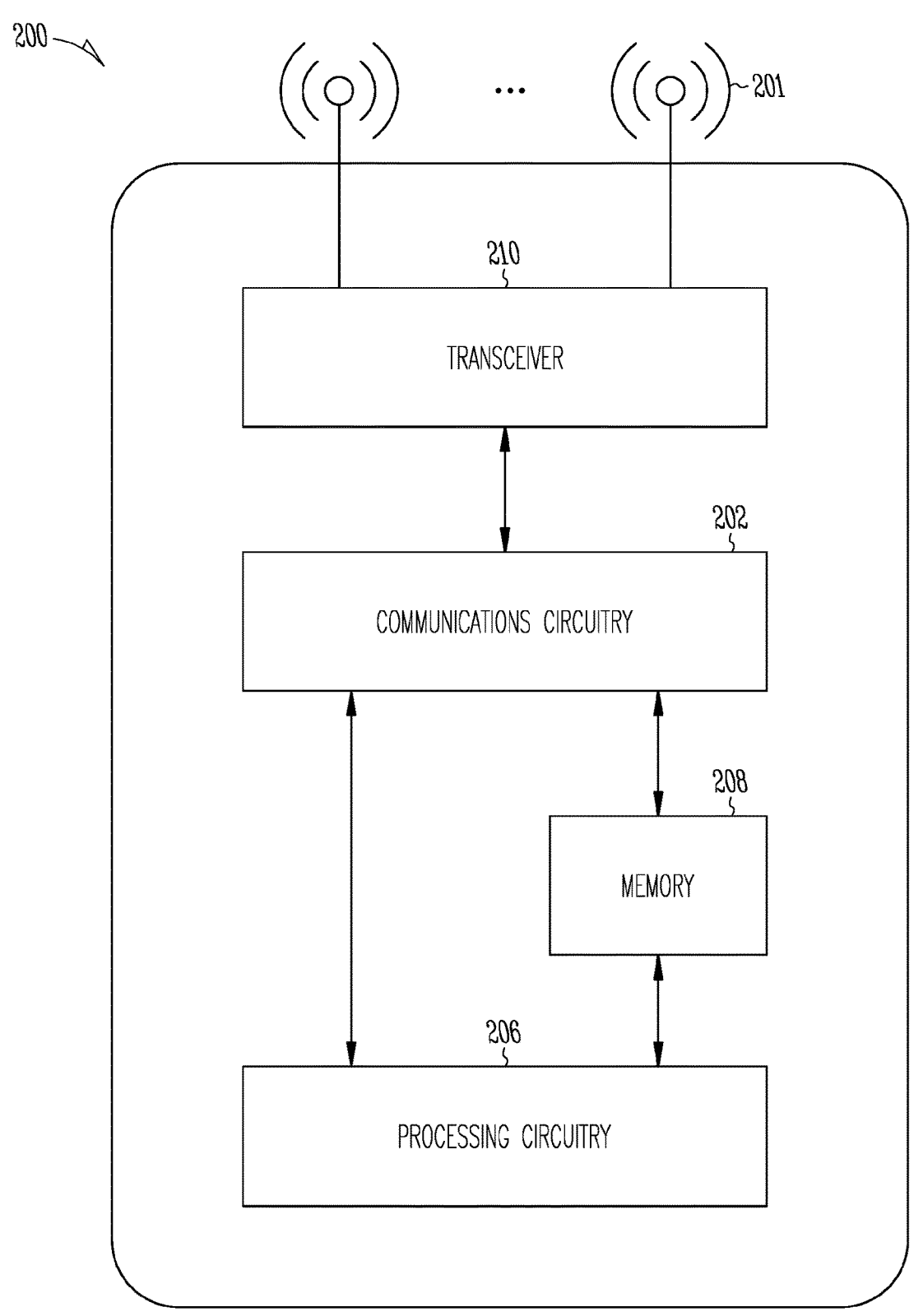
FIG. 2 is a functional block diagram of a wireless communication device, in accordance with some embodiments.

FIG. 2 illustrates a functional block diagram of a wireless communication device, in accordance with some embodiments. Wireless communication device 200 may be suitable for use as a UE or gNB configured for operation in a 5G NR network.

The communication device 200 may include communications circuitry 202 and a transceiver 210 for transmitting and receiving signals to and from other communication devices using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication device 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication device 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 200 may include one or more of a keyboard, a display, a non-volatile memory port, multiple antennas, a graphics processor, an application processor, speakers, and other mobile device elements. The display may be an LCD screen including a touch screen.

Although the communication device 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 200 may refer to one or more processes operating on one or more processing elements.

In the NR Rel-15 spec, different types of SRS resource sets are supported. The SRS resource set is configured with a parameter of 'usage', which can be set to 'beamManagemene', 'codebook', 'nonCodebook' or 'antennaSwitching'. The SRS resource set configured for 'beamManagement' is used for beam acquisition and uplink beam indication using SRS. The SRS resource set configured for 'codebook' and 'nonCodebook' is used to determine the UL precoding with explicit indication by TPMI (transmission precoding matrix index) or implicit indication by SRI (SRS resource index). Finally, the SRS resource set configured for 'antennaSwitching' is used to acquire DL channel state information (CSI) using SRS measurements in the UE by leveraging reciprocity of the channel in TDD systems. For SRS transmission, the time domain behavior could be periodic, semi-persistent or aperiodic.

FIG. 1D illustrates an RRC message for an SRS resource set, in accordance with some embodiments. FIG. 1E illustrates an RRC configuration for an SRS resource, in accordance with some embodiments.

When a SRS resource set is configured as 'aperiodic', the SRS resource set also includes configuration of slot offset (slotOffset) and trigger state(s) (aperiodicSRS-Resource Trigger, aperiodicSRS-ResourceTriggerList). The parameter of slotOffset defines the slot offset relative to PDCCH where SRS transmission should be commenced. The triggering state(s) defines which DCI codepoint(s) triggers the corresponding SRS resource set transmission.

The aperiodic SRS could be triggered via SRS Request field in DCI. SRS Request field could be carried by DCI format 0_1/0_2/1_1/1_2/2_3, wherein DCI format 0_1/0_2 is used for scheduling PUSCH, DCI format 1_1/1_2 is used for scheduling PDSCH and DCI format 2_3 is used to trigger aperiodic SRS for a group of UEs.

Table 1 shows the detailed fields and field length for DCI format 0_1 and 0_2 as defined by 3GPP TS 38.212 v16.4.0.

TABLE 1

| Field length for DCI format 0_1 and 0_2 | | |
| --- | --- | --- |
| Field | DCI format 0_1 | DCI format 0_2 |
| Identifier for DCI format | 1 | 1 |
| Carrier Indicator (CIF) | 0/3 | 0~3 |
| DFI flag | 0/1 | N/A |
| UL/SUL indicator | 0/1 | 0/2 |
| Bandwidth part (BWP) indicator | 0~2 | 0~2 |
| Frequency domain resource assignment (FDRA) | 0~18 | 0~18 |

TABLE 1-continued

| | Field length for DCI format 0_1 and 0_2 | |
| Field | DCI format 0_1 | DCI format 0_2 |
| --- | --- | --- |
| Time domain resource assignment (TDRA) | 0~6 | 0~6 |
| Frequency hopping (FH) flag | 0/1 | 0/1 |
| Modulation and coding scheme (MCS) | 5 | 5 |
| New data indicator (NDI) | 1~8 | 1 |
| Redundancy version (RV) | 2~8 | 0~2 |
| HARQ process number | 4 | 0~4 |
| 1$^{st}$ downlink assignment index (DAI) | 1/2/4 | 0/1/2/4 |
| 2$^{nd}$ DAI | 0/2/4 | N/A |
| TPC command for PUSCH | 2 | 2 |
| SRS resource indicator (SRI) | 1~4 | 0~4 |
| Precoding information and number of layers | 0~6 | 0~6 |
| Antenna ports | 2~5 | 0/2/3/4/5 |
| SRS request | 2/3 | 0~3 |
| CSI request | 0~6 | 0~6 |
| CBG transmission information (CBGTI) | 0/2/4/6/8 | N/A |
| PTRS-DMRS association | 0/2 | 0/2 |
| Beta-offset indicator | 0/2 | 0~2 |
| DMRS sequence initialization | 0/1 | 0/1 |
| UL-SCH indicator | 0/1 | 0/1 |
| ChannelAccess-CPext-CAPC | 0~6 | N/A |
| Open-loop power control parameter set indication | 0/1/2 | 0/1/2 |
| Priority indicator | 0/1 | 0/1 |
| Invalid symbol pattern indicator | 0/1 | 0/1 |
| Minimum applicable scheduling offset indicator | 0/1 | N/A |
| SCell dormancy indication | 0~5 | N/A |
| Sidelink assignment index | 0/1/2 | N/A |

Similarly, the detailed field description for DCI format 1_1 and 1_2 can be found in TS 38.212 v16.4.0.

It can be observed for a single UE, currently the SRS Request is always sent together with DCI which schedules downlink or uplink data transmission.

In order to improve flexibility for aperiodic SRS transmission, the SRS could be triggered via DCI without scheduling data, i.e. UL-SCH indicator field (1-bit) is set to '0' and SRS Request field is set to non-zero. In this case, a lot of DCI fields in DCI will be un-used and could be re-purposed to facilitate SRS transmission.

Some un-used fields could be repurposed to dynamically indicate the resource allocation for the triggered SRS, including frequency domain resource and time domain resource. However, in current spec, there are a lot of parameters for frequency and time resource allocation for SRS. In order to reduce the overhead, a list of frequency resource allocation and/or time resource allocation could be configured by RRC, and one of the resource allocation could be indicated by DCI.

The current DCI format 0_1/0_2 without scheduling PUSCH doesn't consider the overhead for dynamically indicated SRS configuration on resource allocation.

Among other things, embodiments of the present disclosure are directed to support of low overhead indication of resource allocation for aperiodic SRS when aperiodic SRS is triggered via DCI format 0_1/0_2 without scheduling PUSCH.

DCI Indicated SRS Resource Allocation

Figure 3:
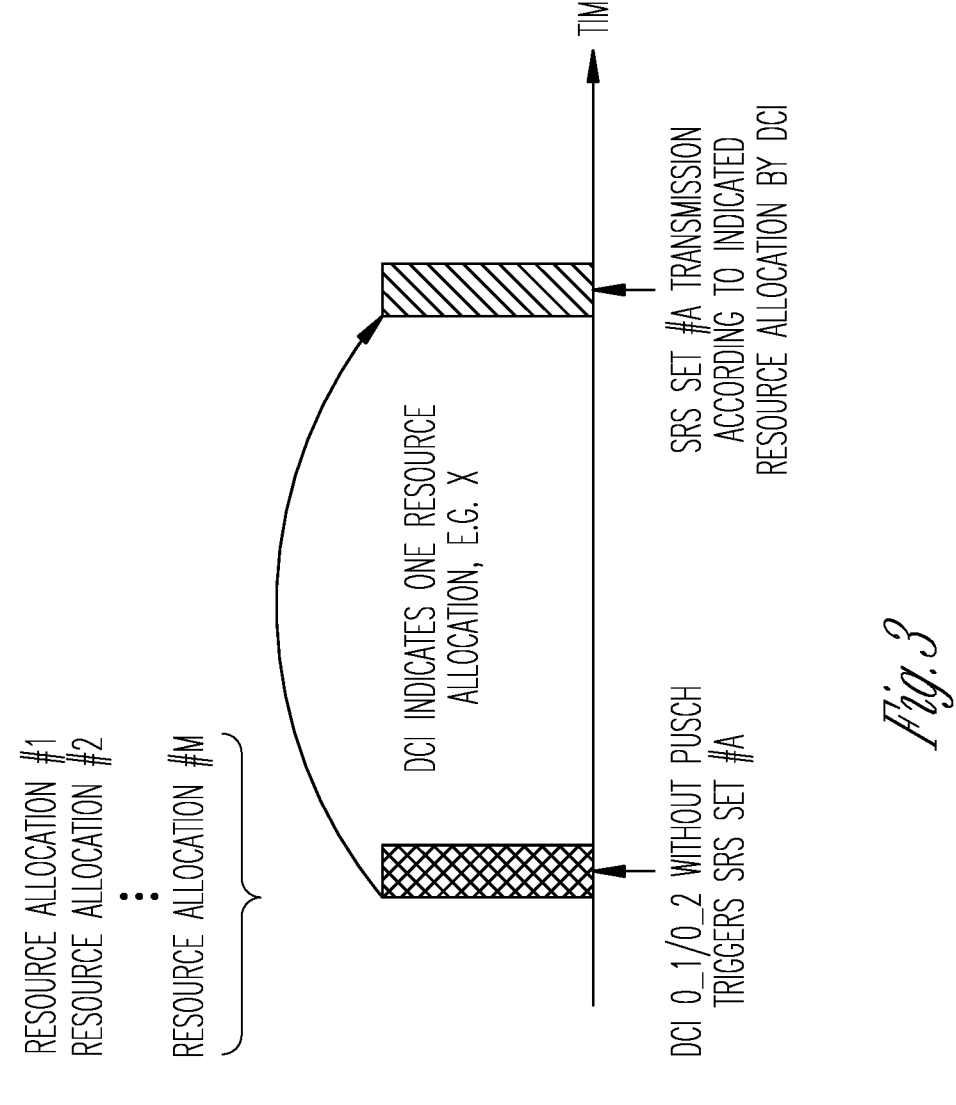
FIG. 3 illustrates DCI indicated resource allocation for SRS transmission, in accordance with some embodiments.

In some embodiments, for aperiodic SRS triggered by DCI format 0_1/0_2 without scheduling PUSCH and CSI Request, some unused fields could be repurposed to indicate the frequency domain resource allocation for the triggered aperiodic SRS. A list of frequency domain resource allocations could be configured by RRC, for example, a list of M frequency domain resource allocation is configured by RRC. The list of frequency domain resource allocation could be introduced at SRS resource set level or SRS resource level. In DCI, some unused bits can be used to dynamically indicate one or several frequency resource allocation from the M configured allocations, which will be applied for the SRS transmission triggered by the DCI. FIG. 3 shows an example of the operation.

The frequency resource allocation could include some or all of the following parameters:

nrofSRS-Ports, indicating the number of antenna ports for SRS ptrs-PortIndex, indicating the PTRS port for the SRS transmissionComb, indicating the comb for SRS, comb offset and cyclic shift freqDomainPosition, indicating the frequency position freqDomainShift, indicating the frequency shift freqHopping {including c-SRS, b-SRS, b-hop}, parameters for frequency hopping groupOrSequenceHopping, indicating whether group or sequence hopping is enabled or not Indicator of DL/UL BWP, indicating whether the SRS transmission should follow the bandwidth of uplink BWP or downlink BWP.

BWP ID, indicating which BWP the SRS transmission should be performed. The BWP ID could be different with the current active BWP, i.e. the SRS transmission could be over a different BWP and the UE should switch back to the active BWP after SRS transmission.

In one example, the frequency resource allocation indicated by DCI is applied to all the SRS resources within all the aperiodic SRS resource sets triggered by the DCI.

In another example, the frequency resource allocation indicated by DCI is applied to all the SRS resources within one SRS resource set. If multiple SRS resource sets are triggered by the same DCI, then multiple frequency resource allocations should be indicated, i.e. one resource allocation for each SRS resource set.

In another example, the frequency resource allocation indicated by DCI is applied to one SRS resource. Regarding multiple SRS resources triggered by the DCI, multiple resource allocation should be indicated.

In another embodiment, the carrier indictor in DCI format 0_1/0_2 without scheduling PUSCH and CSI Request could trigger cross carrier SRS transmission. For example, the SRS will be triggered to be transmitted over a different carrier other than the carrier carrying the trigger DCI.

In another example, the carrier indicator could be repurposed as a bitmap and can trigger SRS transmission over multiple carriers. In this case, the list of the values on available slot in each SRS resource set should be configured for each carrier.

In another example, for DCI format 0_1/0_2 without scheduling PUSCH and without CSI Request, if the DCI triggers aperiodic SRS, then the field of carrier indicator will be discarded by the UE.

In another embodiment, for aperiodic SRS triggered by DCI format 0_1/0_2 without scheduling PUSCH and CSI Request, some unused fields could be repurposed to indicate the time domain resource allocation for the triggered aperiodic SRS. A list of time domain resource allocations could be configured by RRC, for example, a list of N time domain resource allocation is configured by RRC. The list of time domain resource allocation could be introduced at SRS resource set level or SRS resource level. In DCI, some unused bits can be used to dynamically indicate one or several time resource allocation, which will be applied for the SRS transmission triggered by the DCI. In one example, the list of frequency resource allocation and the list of time resource allocation could be jointly configured by RRC or separately configured by RRC.

The time resource allocation could include some or all of the following parameters:

startPosition, indicating the starting OFDM symbols for SRS
nrofSymbols, indicating the number of OFDM symbols for SRS
repetitionFactor, indicating the repetition factor for SRS etc.

In one example, the time resource allocation indicated by DCI is applied to all the SRS resources within all the aperiodic SRS resource sets triggered by the DCI.

In another example, the time resource allocation indicated by DCI is applied to all the SRS resources within one SRS resource set. If multiple SRS resource sets are triggered by the same DCI, then multiple time resource allocations should be indicated, i.e. one resource allocation for each SRS resource set.

In another example, the time resource allocation indicated by DCI is applied to one SRS resource. Regarding multiple SRS resources triggered by the DCI, multiple resource allocation should be indicated.

In another embodiment, in order to avoid collision, OFDM symbol offset could be indicated by some unused fields for aperiodic SRS triggered by DCI format 0_1/0_2 without scheduling PUSCH and CSI Request.

Figure 4:
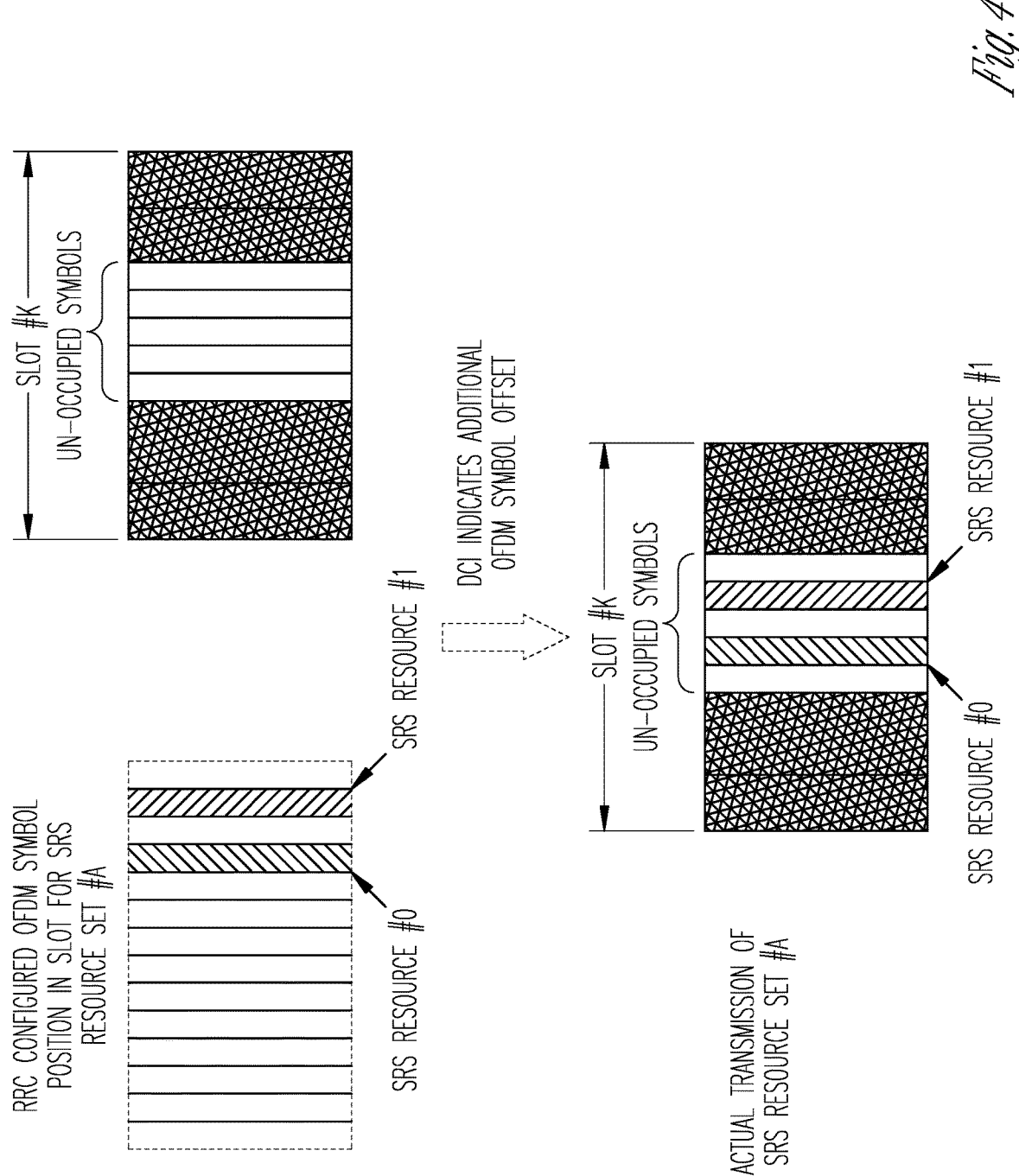
FIG. 4 illustrates a OFDM symbol offset indicated by DCI to avoid collision, in accordance with some embodiments.

FIG. 4 shows an example. SRS resource #0 and #1 is configured by RRC to be over OFDM symbol #10 and #12. In the slot K, the OFDM symbol #10 and #12 are occupied. In this case, DCI could indicates additional OFDM symbol offset, for example, value of 4, then SRS resource #0 and #1 will be transmitted over OFDM symbol #6 and #8 within slot #K.

The OFDM symbol offset could be applied to all the SRS resources within all the aperiodic SRS resource sets triggered by the DCI and only one indication of OFDM symbol offset is included in the DCI. Or it could be applied to all the SRS resources within one SRS resource set and multiple indications of OFDM symbol offset should be included in the DCI if multiple SRS resource sets are triggered. Or it could be applied to one SRS resource and multiple indications should be included in the DCI.

In another embodiment, in order to avoid collision, slot offset could be indicated by some unused fields for aperiodic SRS triggered by DCI format 0_1/0_2 without scheduling PUSCH and CSI Request.

Figure 5:
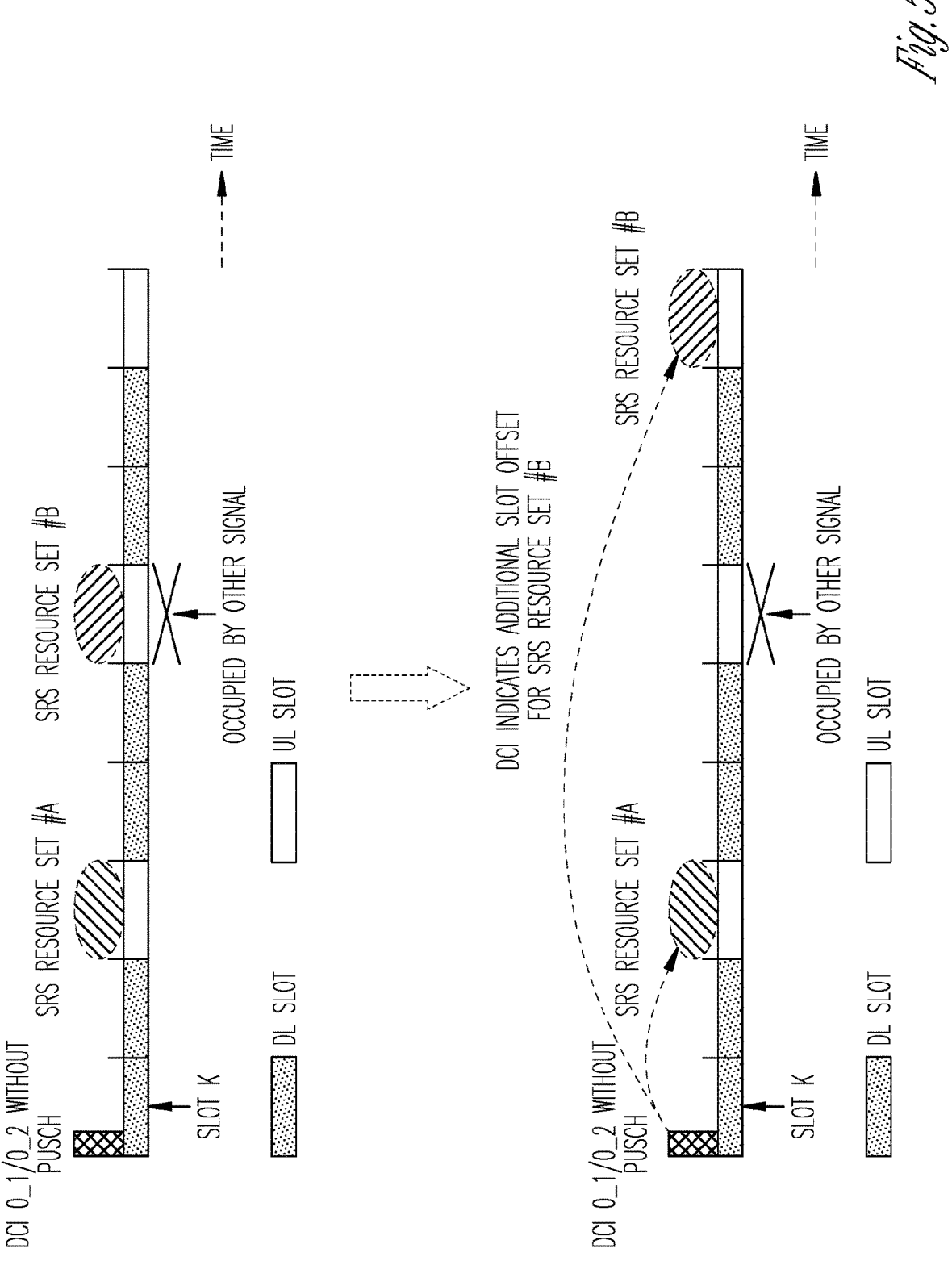
FIG. 5 illustrates a slot offset indicated by DCI to avoid collision, in accordance with some embodiments.

FIG. 5 shows an example of the operation. The original slot for SRS resource set #B is occupied by other uplink signals. In this case, the DCI 0_1/0_2 without scheduling PUSCH can indicate additional slot offset for SRS resource set #B, so that SRS resource set #B is transmitted in the next uplink slot to avoid collision.

The slot offset could be applied to all the aperiodic SRS resource sets triggered by the DCI and only one indication of slot offset is included in the DCI. Or it could be applied to one or several SRS resource set(s) and multiple indications of slot offset should be included in the DCI if multiple SRS resource sets are triggered.

Reconfiguration of SRS Usage by DCI

In some embodiments, for aperiodic SRS triggered by DCI format 0_1/0_2 without scheduling PUSCH and CSI Request, some unused bits could be repurposed to reconfigure the usage ('codebook', 'nonCodebook', 'antennaSwitching', 'beamManagement') of the triggered aperiodic SRS resource set(s). The DCI indicated usage could be applied to all the aperiodic SRS resource sets triggered by the DCI (or the DCI indicated usage only applies to the aperiodic SRS resource sets with certain usage configured by RRC, for example, 'codebook' or 'nonCodebook'). Or multiple usages could be indicated by DCI and each usage corresponding to one SRS resource set. Or the usages indicated by DCI could be applied to some aperiodic SRS resources.

For example, if the aperiodic SRS resource set is configured with usage of 'codebook' or 'nonCodebook' by RRC, when the gNB would like to use it for antenna switching, the gNB could use DCI 0_1/0_2 without data to trigger the SRS resource set and indicate the usage of 'antennaSwitching'.

In another example, the usage of the aperiodic SRS resource set for 'codebook' or 'nonCodebook' could be implicitly changed by DCI format 0_1/0_2 without scheduling PUSCH. The aperiodic SRS resource set for 'codebook' or 'nonCodebook' triggered by DCI format 0_1/0_2 without scheduling PUSCH will be used for antenna switching. For example, one aperiodic SRS resource set is configured with usage of 'codebook' by RRC, if it is triggered by DCI format 0_1/0_2 without scheduling PUSCH, then the aperiodic SRS resource set will be used for antenna switching.

Reconfiguration of TPC Accumulation by DCI

In some embodiments, for aperiodic SRS triggered by DCI format 0_1/0_2 without scheduling PUSCH and CSI Request, some unused bits could be repurposed to indicate whether TPC command accumulation is applied to the triggered SRS resource set(s) or not. For example, if the SRS is configured by RRC with TPC accumulation enabled, and the DCI indicate TPC accumulation disabled, then for the triggered SRS resource set(s), the TPC accumulation is not applied for power control.

Validity of SRS Reconfiguration Via DCI

Figure 6:
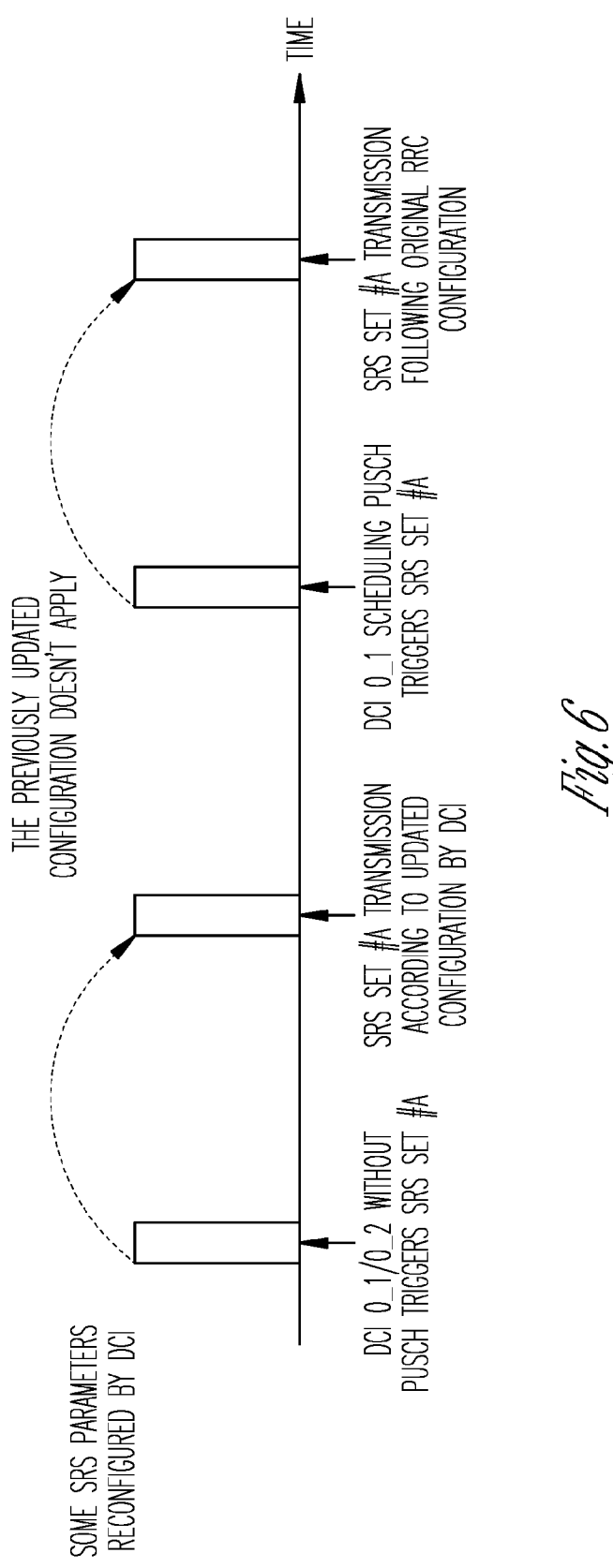
FIG. 6 illustrates validity of SRS reconfiguration via DCI, in accordance with some embodiments.

In some embodiments, for aperiodic SRS triggered by DCI format 0_1/0_2 without scheduling PUSCH and CSI Request, if the DCI dynamically changes the SRS configuration, such as frequency resource allocation, time resource allocation, power control parameters (p0, alpha, pathloss reference RS, power adjustment state, spatial relation, TPC accumulation, etc.), usages, etc., then the changed configuration only applies to the SRS transmission triggered by the same DCI because there is no ACK mechanism for DCI. Later on, if the same aperiodic SRS resource set is triggered by another DCI, then the previous configuration by RRC should be applied. FIG. 6 shows an example of the operation.

In another embodiment, for aperiodic SRS triggered by DCI format 0_1/0_2 without scheduling PUSCH and CSI Request, if the DCI dynamically changes the SRS configuration, then the changed configuration could also be applied to the same SRS resource set(s) in future transmission triggered by another DCI.

In another embodiment, for aperiodic SRS triggered by DCI format 0_1/0_2 without scheduling PUSCH and CSI Request, if the DCI dynamically changes the SRS configuration, after the gNB receives the SRS following the indicated configuration, then indicated SRS configuration could be applied to the same SRS resource set(s) in future transmissions.

BWP Switching Operation

In some embodiments, for aperiodic SRS triggered by DCI format 0_1/0_2 without scheduling PUSCH and without CSI Request, the field of BWP Indicator is still used for BWP switching command. The UE is not expect to receive the DCI 0_1/0_2 without scheduling PUSCH and CSI Request and with aperiodic SRS triggered, wherein the DCI includes BWP indicator indicating uplink BWP change, if the time offset between the DCI and the transmission of the first SRS is less than the delay requirement by the UE for uplink BWP change. I.e. if the time offset between the DCI and the transmission of the first SRS is less than the delay requirement for active BWP change, the BWP indicator indicating BWP change is not valid.

In another embodiment, for aperiodic SRS triggered by DCI format 0_1/0_2 without scheduling PUSCH and without CSI Request, the field of BWP Indicator is discarded by the UE, i.e. it is not used for BWP switching or it is viewed as an invalid BWP switching command.

In another example, the BWP indicator could be repurposed for other usage, for example to reconfigure some SRS parameters.

In another embodiment, for aperiodic SRS triggered by DCI format 0_1/0_2 without scheduling PUSCH and without CSI Request, the field of TDRA is not repurposed for other usage. The BWP indicator is still used as BWP switching command. Whether it is valid BWP command still follows the existing rules, i.e. it is not valid if the time offset for PUSCH indicated TDRA is smaller than the delay requirement for active BWP change.

In another embodiment, if the UE receives DCI format 0_1/0_2 without scheduling PUSCH and without CSI Request which triggers aperiodic SRS, then the MAC layer in the UE should start or re-start the bwp-Inactivity Timer. Or the DCI format 0_1/0_2 without scheduling PUSCH and without CSI Request which triggers aperiodic SRS is considered as uplink grant or dynamic uplink grant.

In another example, the DCI format 0_1/0_2 without scheduling PUSCH and without CSI Request which triggers aperiodic SRS doesn't impact the running of bwp-InactivityTimer in MAC layer.

Note: the embodiments in this Section could also be applied to the following cases:

DCI format 0_1/0_2 without scheduling UL-SCH, without CSI Request, without triggering SRS DCI format 0_1/0_2 without scheduling UL-SCH, without triggering SRS, with CSI Request DCI format 0_1/0_2 without scheduling UL-SCH, with CSI Request, with triggering SRS

EXAMPLES

Example 1 may include a method of operating a wireless network that includes a gNB adapted to send DCI to the UE to trigger aperiodic SRS transmission via SRS Request field. The DCI format could be 0_1/0_2/1_1/1_2/2_3.

Example 2 may include the method of example 1 or some other example herein, wherein the SRS Request field could be carried via DCI format 0_1/0_2 without scheduling PUSCH data and CSI Request.

Example 3 may include the method of example 2 or some other example herein, wherein for aperiodic SRS triggered by DCI format 0_1/0_2 without scheduling PUSCH and CSI Request, some unused fields could be repurposed to indicate the frequency domain resource allocation for the triggered aperiodic SRS. A list of frequency domain resource allocations could be configured by RRC. The list of frequency domain resource allocation could be introduced at SRS resource set level or SRS resource level. In DCI, some unused bits can be used to dynamically indicate one or several frequency resource allocation, which will be applied for the SRS transmission triggered by the DCI.

Example 4 may include the method of example 3 or some other example herein, wherein the frequency resource allocation could include some or all of the following parameters: {nrofSRS-Ports, ptrs-PortIndex, transmissionComb, freqDomainPosition, freqDomainShift, freqHopping, groupOrSequenceHopping}

Example 5 may include the method of example 2 or some other example herein, wherein for aperiodic SRS triggered by DCI format 0_1/0_2 without scheduling PUSCH and CSI Request, some unused fields could be repurposed to indicate the time domain resource allocation for the triggered aperiodic SRS. A list of time domain resource allocations could be configured by RRC. The list of time domain resource allocation could be introduced at SRS resource set level or SRS resource level. In DCI, some unused bits can be used to dynamically indicate one or several time resource allocation, which will be applied for the SRS transmission triggered by the DCI. The list of frequency resource allocation and the list of time resource allocation could be jointly configured by RRC or separately configured by RRC.

Example 6 may include the method of example 5 or some other example herein, wherein the time resource allocation could include some or all of the following parameters: {startPosition, nrofSymbols, repetitionFactor}

Example 7 may include the method of example 2 or some other example herein, wherein in order to avoid collision, OFDM symbol offset could be indicated by some unused fields for aperiodic SRS triggered by DCI format 0_1/0_2 without scheduling PUSCH and CSI Request.

Example 8 may include the method of example 2 or some other example herein, wherein in order to avoid collision, slot offset could be indicated by some unused fields for aperiodic SRS triggered by DCI format 0_1/0_2 without scheduling PUSCH and CSI Request.

Example 9 may include the method of example 2 or some other example herein, wherein for aperiodic SRS triggered by DCI format 0_1/0_2 without scheduling PUSCH and CSI Request, some unused bits could be repurposed to reconfigure the usage ('codebook', 'nonCodebook', 'antennaSwitching', 'beamManagement') of the triggered aperiodic SRS resource set(s). The DCI indicated usage could be applied to all the aperiodic SRS resource sets triggered by the DCI (or the DCI indicated usage only applies to the aperiodic SRS resource sets with certain usage configured by RRC, for example, 'codebook' or 'nonCodebook'). Or multiple usages could be indicated by DCI and each usage corresponding to one SRS resource set. Or the usages indicated by DCI could be applied to some aperiodic SRS resources.

Example 10 may include the method of example 9 or some other example herein, wherein the usage of SRS could be explicitly indicated. For example, if the aperiodic SRS resource set is configured with usage of 'codebook' or 'nonCodebook' by RRC, when the gNB would like to use it for antenna switching, the gNB could use DCI 0_1/0_2 without data to trigger the SRS resource set and indicate the usage of 'antennaSwitching'.

Example 11 may include the method of example 9 or some other example herein, wherein the usage of SRS could be changed implicitly by DCI format 0_1/0_2 without scheduling PUSCH. The aperiodic SRS resource set for 'codebook' or 'nonCodebook' triggered by DCI format 0_1/0_2 without scheduling PUSCH will be used for antenna switching.

Example 12 may include the method of example 2 or some other example herein, wherein for aperiodic SRS triggered by DCI format 0_1/0_2 without scheduling PUSCH and CSI Request, some unused bits could be repurposed to indicate whether TPC command accumulation is applied to the triggered SRS resource set(s) or not.

Example 13 may include the method of example 2 or some other example herein, wherein for aperiodic SRS triggered by DCI format 0_1/0_2 without scheduling PUSCH and CSI Request, if the DCI dynamically changes the SRS configuration, such as frequency resource allocation, time resource allocation, power control parameters (p0, alpha, pathloss reference RS, power adjustment state, spatial relation, TPC accumulation, etc.), usages, etc., then the changed configuration only applies to the SRS transmission triggered by the same DCI. Later on, if the same aperiodic SRS resource set is triggered by another DCI, then the previous configuration should be applied.

Example 14 may include the method of example 2 or some other example herein, wherein for aperiodic SRS triggered by DCI format 0_1/0_2 without scheduling PUSCH and CSI Request, if the DCI dynamically changes the SRS configuration, then the changed configuration could also be applied to the same SRS resource set(s) in future transmission triggered by another DCI Example 15 may include the method of example 2 or some other example herein, wherein for aperiodic SRS triggered by DCI format 0_1/0_2 without scheduling PUSCH and CSI Request, if the DCI dynamically changes the SRS configuration, after the gNB receives the SRS following the indicated configuration, then indicated SRS configuration could be applied to the same SRS resource set(s) in future transmissions.

Example 16 includes a method comprising: determining a frequency domain resource allocation for a triggered aperiodic sounding reference signal (SRS); and encoding a message for transmission to a user equipment (UE) that includes an indication of the frequency domain resource allocation in downlink control information (DCI).

Example 17 includes the method of example 16 or some other example herein, wherein the DCI has a format that is 0_1, 0_2, 1_1, 1_2, or 2_3.

Example 18 includes the method of example 16 or some other example herein, wherein the DCI includes one or more bits that are to dynamically indicate one or more frequency resource allocations to be applied for an SRS transmission triggered by the DCI.

Example 19 includes the method of example 18 or some other example herein, wherein the frequency resource allocation includes one or more of the following parameters: nrofSRS-Ports, ptrs-PortIndex, transmissionComb, freqDomainPosition, freqDomainShift, freqHopping, or groupOrSequenceHopping.

Example 20 includes the method of example 18 or some other example herein, wherein the message includes a carrier indicator in DCI format 0_1 or 0_2.

Example 21 includes the method of example 18 or some other example herein, wherein the message includes a bitmap that is to trigger SRS transmission over multiple carriers.

Example 22 includes the method of example 21 or some other example herein, wherein the bitmap includes a list of the values on an available slot in each SRS resource set configured for each carrier.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation (5G) new radio (NR) (5G-NR) system, the apparatus comprising: processing circuitry; and memory, the processing circuitry configured to:

decode radio-resource control (RRC) signalling, the RRC signalling to configure the UE with a plurality of frequency-domain resource allocations for aperiodic sounding reference signal (SRS) transmission;

decode a downlink control information (DCI) format, the DCI format comprising one of DCI format 0_1 and DCI format 0_2; and interpret one or more fields of the DCI format differently depending on whether the DCI format schedules a physical uplink shared channel (PUSCH) or the DCI format does not schedule a PUSCH and does not include a channel state information (CSI) request, wherein when the DCI format does not schedule the PUSCH and does not include the CSI request, the processing circuitry is configured to:

interpret one or more fields of the DCI format for the aperiodic SRS transmission triggered by the DCI format, the one of more fields interpreted to indicate one of the frequency-domain resource allocations of the plurality, the one or more fields further interpreted to indicate a bandwidth part (BWP) identifier (ID) (BWP ID) indicating a BWP for the aperiodic SRS transmission;

configure the UE to transmit an SRS in the indicated BWP in accordance with the indicated frequency-domain resource allocation; and switch to an indicated BWP for the aperiodic SRS transmission and to switch back to an active BWP after the aperiodic SRS transmission when the BWP ID indicates a BWP that is not the active BWP, and wherein the memory is configured to store the DCI format.

2. The apparatus of claim 1, wherein when the DCI format does not schedule a PUSCH and does not include a CSI request, the processing circuitry is to further interpret the one or more fields of the DCI format as further including an indicator of DL/UL BWP, the indicator of DL/UL BWP indicating whether a downlink (DL) BWP configuration or an uplink (UL) BWP configuration is to be used by the UE for the aperiodic SRS transmission.

3. The apparatus of claim 2, when the DL BWP configuration is indicated, the UE is configured to transmit the aperiodic SRS transmission following a DL BWP in accordance with the DL BWP configuration, and when the UL BWP configuration is indicated, the UE is configured to transmit the aperiodic SRS transmission following an UL BWP in accordance with the UL BWP configuration.

4. The apparatus of claim 3, wherein when the DCI format schedules the PUSCH, the one or more fields of the DCI format are to be interpreted by the processing circuitry as scheduling information for the PUSCH.

5. The apparatus of claim 4, wherein when the DCI format does not schedule a PUSCH and does not include a CSI request, and when the BWP ID indicates a BWP that is the active BWP for the UE, the processing circuitry is to configure the UE to refrain from switching BWPs for the aperiodic SRS transmission.

6. The apparatus of claim 5, wherein when the DCI format does not schedule a PUSCH and does not include a CSI request, and wherein when the BWP ID indicates a BWP that is not the active BWP for the UE, the processing circuitry is configured to refrain from switching to the indicated BWP for the SRS transmission when a time offset between receipt of the DCI format and a first SRS transmission is less than a delay requirement by the UE for an uplink BWP change.

7. The apparatus of claim 6, wherein when the DCI format does not schedule a PUSCH and does not include a CSI request, the processing circuitry is configured to interrupt a time-domain resource allocation (TDRA) field of the DCI format as indicating a time-domain resource allocation for the aperiodic SRS transmission.

8. The apparatus of claim 7, wherein when the DCI format does not schedule a PUSCH and does not include a CSI request, the processing circuitry is configured to cause a medium-access control (MAC) layer of the UE to initiate a BWP inactivity timer for BWP switching.

9. The apparatus of claim 5, wherein when the DCI format includes a carrier indicator, and wherein when the DCI format does not schedule a PUSCH and does not include a CSI request, the processing circuitry is configured to discard the carrier indicator.

10. The apparatus of claim 1, wherein when the DCI format includes a carrier indicator, and wherein when the DCI format does not schedule a PUSCH and does not include a CSI request, the processing circuitry is configured to interpret the carrier indicator as triggering a cross-carrier SRS transmission in which the SRS is to be transmitted over a different carrier than a carrier carrying the DCI format.

11. The apparatus of claim 1, wherein when the DCI format includes a carrier indicator, and wherein when the DCI format does not schedule a PUSCH and does not include a CSI request, the processing circuitry is configured to interpret the carrier indicator as bitmap triggering the aperiodic SRS transmission over multiple carriers.

12. A non-transitory computer-readable storage medium that stores instructions for execution by processing circuitry of a user equipment (UE) configured for operation in a fifth-generation (5G) new radio (NR) (5G-NR) system, the instructions to configure the processing circuitry to:

decode radio-resource control (RRC) signalling, the RRC signalling to configure the UE with a plurality of frequency-domain resource allocations for aperiodic sounding reference signal (SRS) transmission;

decode a downlink control information (DCI) format, the DCI format comprising one of DCI format 0_1 and DCI format 0_2;

interpret one or more fields of the DCI format differently depending on whether the DCI format schedules a physical uplink shared channel (PUSCH) or the DCI format does not schedule a PUSCH and does not include a channel state information (CSI) request, wherein when the DCI format does not schedule the PUSCH and does not include the CSI request, the processing circuitry is configured to:

interpret one or more fields of the DCI format for the aperiodic SRS transmission triggered by the DCI format, the one of more fields interpreted to indicate one of the frequency-domain resource allocations of the plurality, the one or more fields further interpreted to indicate a bandwidth part (BWP) identifier (ID) (BWP ID) indicating a BWP for the aperiodic SRS transmission;

configure the UE to transmit an SRS in the indicated BWP in accordance with the indicated frequency-domain resource allocation; and switch to an indicated BWP for the aperiodic SRS transmission and to switch back to an active BWP after the aperiodic SRS transmission when the BWP ID indicates a BWP that is not the active BWP.

13. The non-transitory computer-readable storage medium of claim 12, wherein when the DCI format does not schedule a PUSCH and does not include a CSI request, the processing circuitry is to further interpret the one or more fields of the DCI format as further including an indicator of DL/UL BWP, the indicator of DL/UL BWP indicating whether a downlink (DL) BWP configuration or an uplink (UL) BWP configuration is to be used by the UE for the aperiodic SRS transmission.

14. The non-transitory computer-readable storage medium of claim 13, when the DL BWP configuration is indicated, the UE is configured to transmit the aperiodic SRS transmission following a DL BWP in accordance with the DL BWP configuration, and when the UL BWP configuration is indicated, the UE is configured to transmit the aperiodic SRS transmission following an UL BWP in accordance with the UL BWP configuration.

15. The non-transitory computer-readable storage medium of claim 14, wherein when the DCI format schedules the PUSCH, the one or more fields of the DCI format are to be interpreted by the processing circuitry as scheduling information for the PUSCH.

16. The non-transitory computer-readable storage medium of claim 15, wherein when the DCI format does not schedule a PUSCH and does not include a CSI request, and when the BWP ID indicates a BWP that is the active BWP for the UE, the processing circuitry is to configure the UE to refrain from switching BWPs for the aperiodic SRS transmission.

17. The non-transitory computer-readable storage medium of claim 16, wherein when the DCI format does not schedule a PUSCH and does not include a CSI request, and wherein when the BWP ID indicates a BWP that is not the active BWP for the UE, the processing circuitry is configured to refrain from switching to the indicated BWP for the SRS transmission when a time offset between receipt of the DCI format and a first SRS transmission is less than a delay requirement by the UE for an uplink BWP change.

18. An apparatus for gNodeB (gNB) configured for operation in a fifth-generation (5G) new radio (NR) (5G-NR) system, the apparatus comprising: processing circuitry; and memory, the processing circuitry configured to:

encode radio-resource control (RRC) signalling, the RRC signalling to configure a user equipment (UE) with a plurality of frequency-domain resource allocations for aperiodic sounding reference signal (SRS) transmission;

encode a downlink control information (DCI) format, the DCI format comprising one of DCI format 0_1 and DCI format 0_2 for transmission to the UE;

encode one or more fields of the DCI format to be interpreted differently depending on whether the DCI format schedules a physical uplink shared channel (PUSCH) or the DCI format does not schedule a PUSCH and does not include a channel state information (CSI) request wherein when the DCI format does not schedule the PUSCH and does not include the CSI request, the processing circuitry is configured to:

encode one or more fields of the DCI format for interpretation by the UE for the aperiodic SRS transmission triggered by the DCI format, the one of more fields encoded to indicate one of the frequency-domain resource allocations of the plurality, the one or more fields further encoded to indicate a bandwidth part (BWP) identifier (ID) (BWP ID) indicating a BWP for the aperiodic SRS transmission; and receive an SRS from the UE in the indicated BWP in accordance with the indicated frequency-domain resource allocation, wherein when the DCI format does not schedule the PUSCH and does not include the CSI and when the BWP ID indicates a BWP that is not an active BWP for the UE, the one or more fields are encoded to be interpreted by the UE to cause the UE to switch to the indicated BWP for the aperiodic SRS transmission and to switch back to the active BWP after the aperiodic SRS transmission, and wherein the memory is configured to store the DCI format.

19. The apparatus of claim 18, wherein when the DCI format does not schedule a PUSCH and does not include a CSI request, the processing circuitry is configured to encode the one or more fields of the DCI format as further including an indicator of DL/UL BWP, the indicator of DL/UL BWP indicating whether a downlink (DL) BWP configuration or an uplink (UL) BWP configuration is to be used by the UE for the aperiodic SRS transmission.

20. The apparatus of claim 19, when the DL BWP configuration is indicated, the processing circuitry of the gNB is configured to decode the aperiodic SRS transmission from the UE following a DL BWP in accordance with the DL BWP configuration, and when the UL BWP configuration is indicated, the processing circuitry of the gNB is configured to decode the aperiodic SRS transmission from the UE following an UL BWP in accordance with the UL BWP configuration.

* * * * *